(12) United States Patent
Duboue et al.

(10) Patent No.: US 9,383,467 B2
(45) Date of Patent: Jul. 5, 2016

(54) SEISMIC CABLE FOR SEISMIC PROSPECTION TOLERANT TO FAILURE ON POWER SUPPLYING AND/OR DATA TRANSMISSION LINES

(71) Applicant: SERCEL, Carquefou (FR)

(72) Inventors: Alexis Duboue, Carquefou (FR); Noel Voisin, Lorient (FR); Gaetan Mellier, Nantes (FR)

(73) Assignee: SERCEL, Carquefou (FR)

( * ) Notice: Subject to any disclaimer, the term of this patent is extended or adjusted under 35 U.S.C. 154(b) by 18 days.

(21) Appl. No.: 14/051,349

(22) Filed: Oct. 10, 2013

(65) Prior Publication Data

US 2014/0104981 A1    Apr. 17, 2014

(30) Foreign Application Priority Data

Oct. 12, 2012 (EP) ..................... 12306252

(51) Int. Cl.
| | |
|---|---|
| *G01V 1/38* | (2006.01) |
| *G01V 1/20* | (2006.01) |
| *G01V 1/22* | (2006.01) |
| *H04L 12/437* | (2006.01) |

(52) U.S. Cl.
CPC *G01V 1/38* (2013.01); *G01V 1/201* (2013.01); *G01V 1/22* (2013.01); *H04L 12/437* (2013.01)

(58) Field of Classification Search
CPC ........... G01V 1/38; G01V 1/22; G01V 1/201; H04L 12/437
USPC ..................................... 367/15, 20
See application file for complete search history.

(56) References Cited

U.S. PATENT DOCUMENTS

| | | | |
|---|---|---|---|
| 4,789,968 A * | 12/1988 | Rice ................................ | 367/20 |
| 5,883,856 A | 3/1999 | Carroll et al. | |
| 6,337,636 B1 | 1/2002 | Page et al. | |
| 7,176,589 B2 * | 2/2007 | Rouquette .............. | G01V 1/201 307/17 |
| 2009/0185170 A1 * | 7/2009 | Maas ...................... | G01V 1/226 356/73.1 |

FOREIGN PATENT DOCUMENTS

| | | | | |
|---|---|---|---|---|
| EP | 2 081 053 A2 | 7/2009 | | |
| GB | 2 401 187 A | 11/2004 | | |
| WO | WO 9936802 A1 * | 7/1999 | ............. | E21B 47/12 |
| WO | WO 00/29717 | 5/2000 | | |

* cited by examiner

*Primary Examiner* — Daniel L Murphy

(74) *Attorney, Agent, or Firm* — Blakely Sokoloff Taylor & Zafman LLP

(57) ABSTRACT

A seismic cable including sensors, data transmission lines extending the length of the seismic cable for conveying data signals issued from the sensors. Controllers distributed along the seismic cable operate as an interface between the sensors and the data transmission lines. Power supplying lines supply power to the controllers and the sensors. X power supplying lines are alternately connected to one out of X successive controllers. Each controller is adapted for applying on a power supplying line detected as defective the electrical tension provided by another power supplying line. Y data transmission lines are alternately connected to one out of Y successive controllers. Each controller is adapted to redirect towards at least one adjacent controller the data associated with a data transmission line which is determined to be defective.

14 Claims, 6 Drawing Sheets

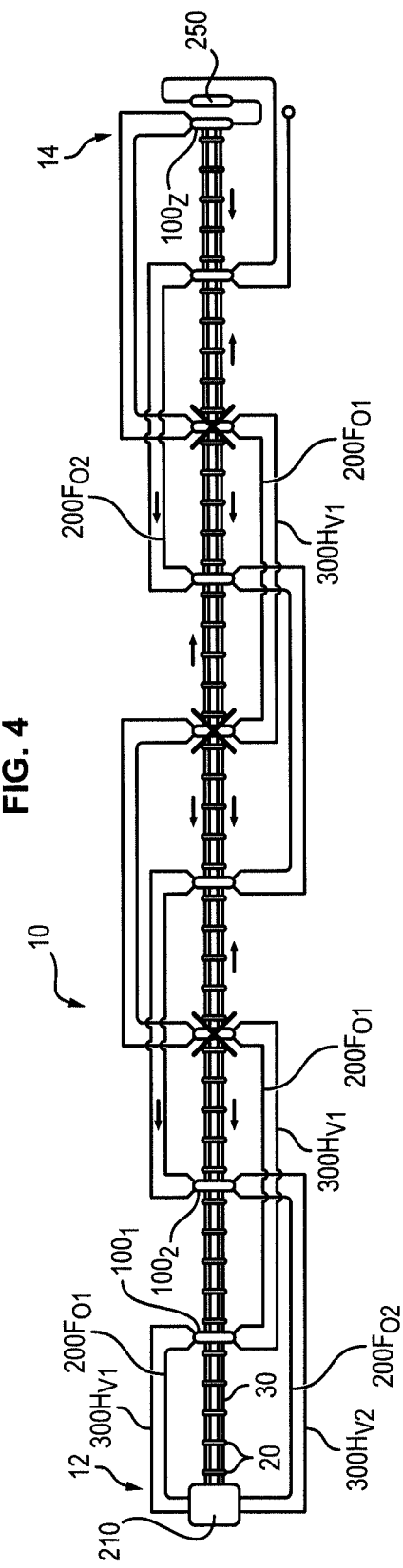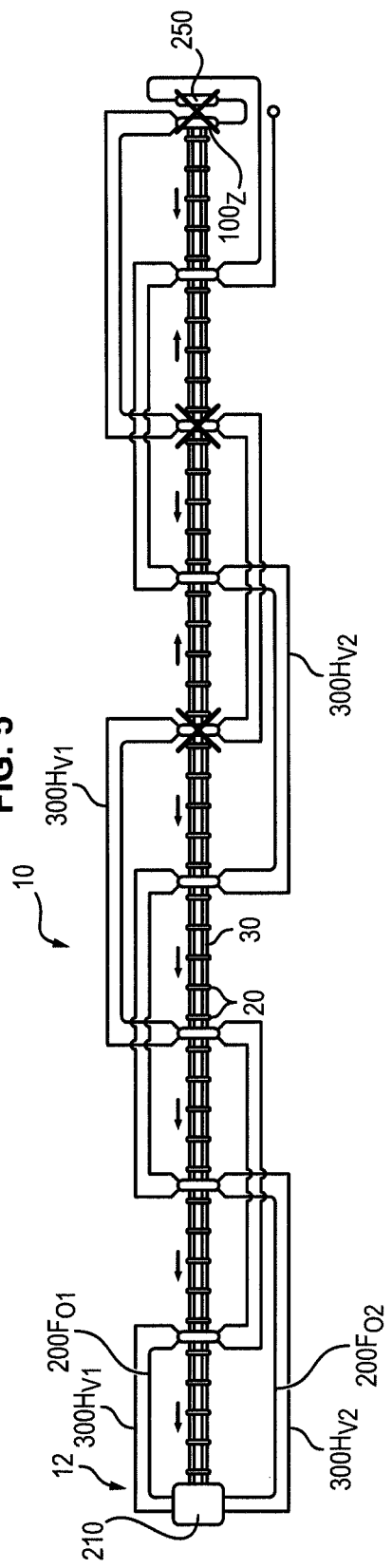

SEISMIC CABLE FOR SEISMIC PROSPECTION TOLERANT TO FAILURE ON POWER SUPPLYING AND/OR DATA TRANSMISSION LINES

FIELD OF THE INVENTION

The invention relates to the seismic prospection field specially designed for hydrocarbon exploration. The invention relates particularly to marine seismic prospection. However the invention may also apply to land seismic prospection.

BACKGROUND OF THE INVENTION

In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layers on either side of the interface.

Marine seismic prospection is generally made with seismic streamers which are towed through water behind a recorder vessel at a water depth normally between about six to about nine meters, but can be towed shallower or deeper. The streamers integrate sensors such as hydrophones to detect seismic signals corresponding to pressure waves. Seismic sources may be also towed behind the recorder vessel. Seismic sources may be for example air gun arrays or water gun arrays or other sources known to those skilled in the seismic art.

In the following description, a seismic cable is understood to be a seismic streamer which can be maintained at a selected depth under a sea surface of a body of water (underwater position), or a cable lying on the sea bed (this last configuration is well known as Ocean Bottom array and the cables are in this case usually called Ocean Bottom Cables (OBC)).

The source may be towed behind a vessel to generate acoustic energy at varying locations or the source may be maintained in a stationary position.

The seismic cables used for the seismic prospection generally comprise sensors, such as hydrophones or geophones, distributed along the seismic cables, data transmission lines (such as copper lines traditionally) extending along the full length of the seismic cables for conveying data signals issued from the sensors, controllers also distributed along the seismic cables and adapted for operating interface between the sensors and the data transmission lines, and power supplying lines for electrically supplying the controllers and the sensors.

Such current systems have limitations in terms of number of channels, due to data rate on the data transmission lines and have also limitation in term of allowable length.

Additionally, failures of in-sea controllers/sensors can have strong effects on the system since reparation generally requests seismic cables retrieval.

Some seismic cables have been designed with architecture tolerant to partial failure of a controller, by using redundant telemetry lines or redundant power supply lines (HV rails).

In case of failure on only one of the telemetry lines on the controller, or sensors, (i.e partial failure), the controllers are able to reroute the data through the redundant (not failed) telemetry line.

In case of power supply failure on only one of the HV rails (partial failure which is short failure most often), the redundant HV rail allows the system to work properly.

But when there is total in-sea controller failure (the controller does not work anymore), the active parts of the seismic cable located after this deficient controller are lost. In consequence, acquisition of data must be stopped, the seismic cable must be retrieved and the deficient controller must be changed.

SUMMARY OF THE INVENTION

The present invention aims to improve the seismic cables tolerance to in-sea units failures and to increase the seismic cable performance in terms of number of channels and maximum allowable length.

For this purpose, the present invention relates to a seismic cable for seismic prospection comprising sensors, such as hydrophones or accelerometers (digital or analog) or geophones, distributed along the seismic cable, data transmission lines such as optical fibers extending along the full length of the seismic cable for conveying data signals issued from the sensors, controllers also distributed along the seismic cable and adapted for operating interface between the sensors and the data transmission lines, and power supplying lines for electrically supplying the controllers and the sensors, characterized in that said seismic cable comprises X power supplying lines and Y data transmission lines, said X power supplying lines being alternately connected to one out of X successive controllers and each controller being adapted for applying on a power supplying line detected as defective the electrical tension provided by another power supplying line, while the Y data transmission lines are alternately connected to one out of Y successive controllers and each controller being adapted to redirect towards at least one adjacent controller the data associated with a data transmission line when this data transmission line is detected as defective.

In other words according to the invention:
the first X controllers are fed by said X power supplying lines respectively and every downstream X controllers are power supplied in series with the previous upstream X controllers respectively;
the first Y controllers are connected to the Y data transmission lines and every downstream Y controllers transmit data by being connected to the previous upstream Y controllers respectively, and moreover:
each controller has its respective upstream and downstream power supply portions and if an upstream power supply portion is detected as defective, each respective controller is adapted to redirect the power supply from another upstream power supply portion to the respective downstream portion.

As explained more in detail in the following description, the invention allows maintaining the seismic cable fully operational even when a data transmission line and/or a power supplying line and/or a controller and/or a sensor is defective.

The means used in accordance with the invention to correct a defect of a power supplying line are switching means suitable to switch so as to connect locally two power supplying lines, while the means used in accordance with the invention to correct a defect of a data transmission line are means redirecting data from a defective data transmission line on at least one other valid data transmission line when a defective data transmission line is detected.

According to a preferential feature said seismic cable in accordance with the invention comprises a reversing loop, preferentially a terminal reversing loop, which interconnects the tail ends of pairs of data transmission lines.

The present invention relates also to a seismic prospection process implementing a seismic cable comprising sensors, such as hydrophones or geophones, distributed along the seismic cable, data transmission lines such as optical fibers extending along the full length of the seismic cable for conveying data signals issued from the sensors, controllers also distributed along the seismic cable and adapted for operating interface between the sensors and the data transmission lines, and power supplying lines for electrically supplying the controllers and the sensors, characterized in that said seismic cable comprising X power supplying lines and Y data transmission lines, said X power supplying lines being alternately connected to one out of X successive controllers while the Y data transmission lines are alternately connected to one out of Y successive controllers, the process includes the step of applying on a power supplying line detected as defective the electrical tension provided by another power supplying line and redirecting towards at least one adjacent controller the data associated with a data transmission line when this data transmission line is detected as defective.

BRIEF DESCRIPTION OF THE DRAWINGS

Additional and other objects, features and advantages of the invention will become apparent from the description set forth hereinafter when considered in conjunction with the accompanying drawings, in which:

FIG. 4 illustrates that the seismic cable in accordance with the present invention is tolerant to several controllers failures (not consecutive);

FIGS. 5 and 6 illustrate that the seismic cable in accordance with the present invention is tolerant to a failure of a power supplying line or a controller;

DETAILED DESCRIPTION OF A PREFERRED EMBODIMENT OF THE INVENTION

Figure 7:
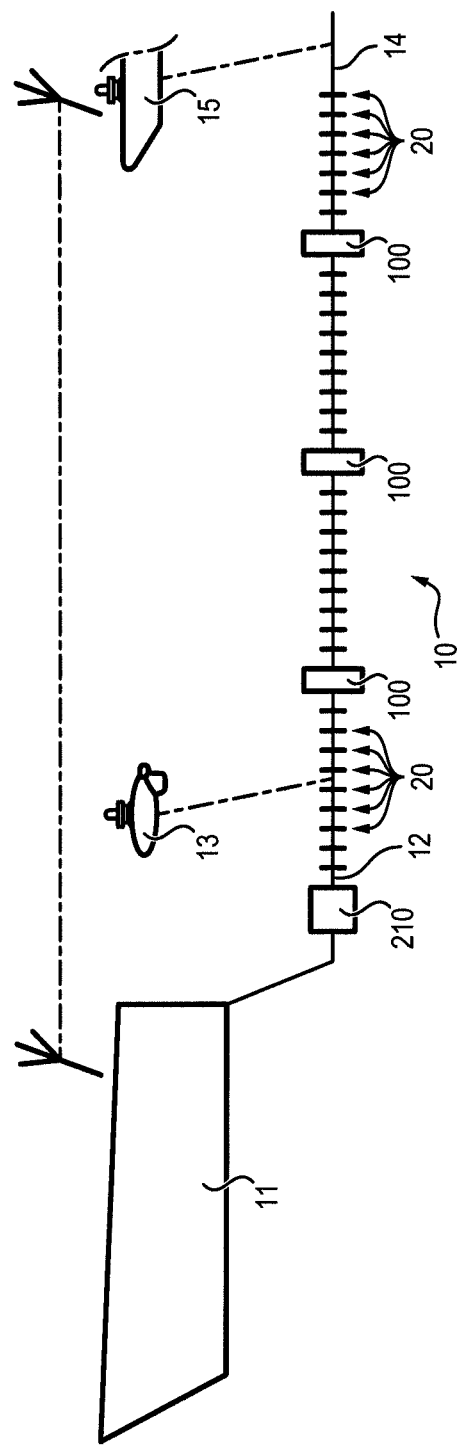
FIG. 7 illustrates a schematic view of a recorder vessel, as well as head and tail buoys associated with a seismic cable of the invention.
Figure 8:
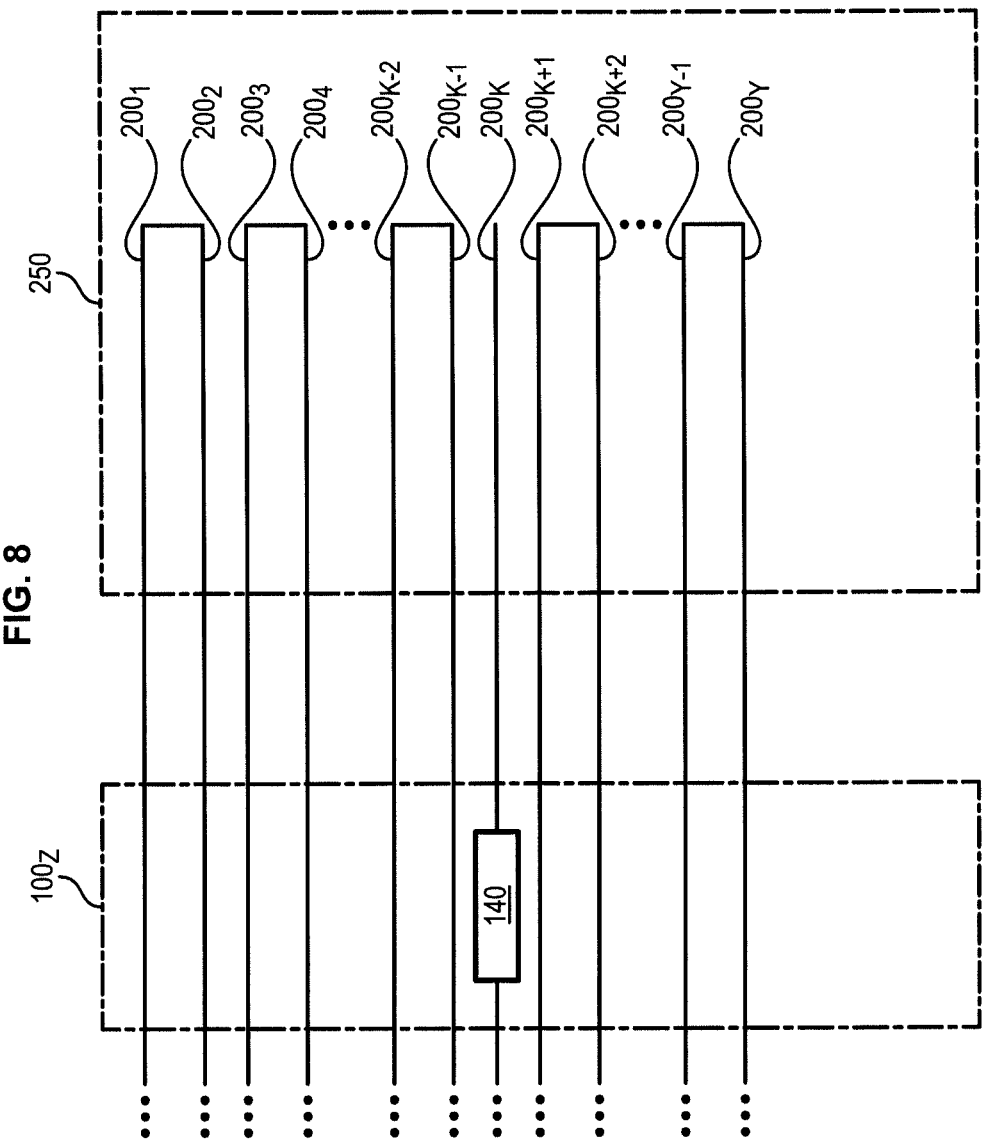
FIG. 8 illustrates a detailed embodiment of a terminal reversing loop which interconnects the tail ends of pairs of data transmission lines.

A seismic data acquisition system as illustrated in FIG. 7 usually comprises:
 a central processing unit onboard a recorder vessel 11;
 a seismic cable 10 (telemetry cable) comprising:
  electronic units (or nodes 20) assembled in series along said seismic cable 10 and each associated with at least one output of seismic sensor, the nodes 20 processing signals transmitted by the sensor(s);
  intermediate modules (or controllers 100) assembled in series along the seismic cable 10 and each associated with at least one of the nodes 20, each controller 100 providing power supply and synchronization of the electronic unit(s) wherewith it is associated.

The seismic cable 10 (FIG. 1) in accordance with the present invention which is illustrated in the enclosed figures has a head end 12 which is typically supported by an head buoy 13 (schematically illustrated on FIG. 7) and which is connected to a recorder vessel 11 (also schematically illustrated on FIG. 7), and a tail end 14 which is typically supported by a tail buoy 15 (also schematically illustrated on FIG. 7).

Said seismic cable comprises a great number of sensors, such as hydrophones, distributed along the seismic cable 10 between the head end 12 and the tail end 14. A hydrophone is a submersible pressure sensor that converts pressure waves into electrical or optical signals. These signals are recorded for signal processing and subsequently evaluated to estimate characteristics of the subsurface of the earth. The seismic cables generally also include in close proximity of the hydrophones, additional sensors such as a pair of orthogonal acoustic particle motion sensors, for example geophones or accelerometers.

Such sensors are well known by the man skilled in the art. Consequently, they will not be described more in detail in the following. Outputs of said sensors are connected to nodes 20 distributed along the seismic cable.

The seismic cable 10 (FIG. 1) comprises also Z controllers 100 distributed along the seismic cable. The controllers 100 concentrate the data issued from a plurality of nodes 20.

The nodes 20 are connected to the controllers 100 by data lines 30 such as electrical copper wires.

More precisely, all the nodes 20 are provided serially along the data lines 30 from the head end 12 until the tail end 14, with the controllers 100 being distributed between groups of nodes 20 on the data lines 30.

Moreover according to the present invention, the seismic cable 10 comprises Y optical backbones 200 forming data transmission lines and X High Voltage rails 300 forming power supplying lines.

The controllers 100 direct the concentrated data received from the nodes and the sensors upon the data transmission lines 200 so as to route said data towards the recorder vessel 11 via a common concentrator 210 provided at the head of the seismic cable.

Said common concentrator 210 has the same function as a controller 100. It comprises moreover a high voltage generator to provide voltage for HV rails 300, and a local memory to record data.

Z, X and Y are integers.

X may be equal to Y.

The number Z of controllers is at least equal to the biggest of X and Y and is preferentially much greater than the biggest of X and Y.

As a general rule: $Z=aX+b$ and $Z=cY+d$, wherein a, b, c and d are also integers, a and c being $\geq 1$, while b and d are $\geq 0$.

The transmission lines 200 extend along the full length of the seismic cable for conveying signals issued from the sensors towards the head end 12 and consequently towards the recorder vessel 11 via the concentrator 210.

Functionalities of a node 20 and a controller 100 will be described in more details in the following.

A node 20 is made up of four basic components:
 a sensing unit;
 a processing unit;
 a transceiver unit; and
 a power unit.

A node 20 may also have additional application-dependent components such as a location finding system, power generator, and mobilizer.

Sensing units are usually composed of two subunits: sensors and analog-to-digital converters (ADCs).

The analog signals produced by the sensors based on the observed phenomenon are converted to digital signals by the ADC, and then fed into the processing unit. The processing unit, which is generally associated with a small storage unit for buffering, manages the procedures that make the nodes 20 collaborate with the other nodes to carry out the assigned sensing tasks. A transceiver unit connects the node 20 to the network.

As discussed, each node 20 performs the analog to digital conversion of the signal from sensors, if sensors are analog sensors (geophone or hydrophone). If sensors are digital (sensors are micro-machined accelerometer for example), no conversion is performed by the corresponding node 20.

Then, these data are sent to a central data processing unit onboard the recorder vessel 11 via the network of data transmission lines 200. More precisely, each node 20 has the capabilities to collect data and route data back to a controller 100. The data are conventionally sent from the nodes 20 to the central processing unit via controllers 100 and via the common concentrator 210.

Each controller 100 performs different functions, including:
- power supply of the nodes 20 via the high voltage rails 300;
- synchronization of the data;
- data retrieval from the nodes 20 through the data lines 30
- local storage for buffering of the seismic data
- data routing through the optical backbone 200 towards the recorder vessel 11
- interface with the recorder vessel (processing of commands received from the recorder vessel 11)
- pre-processing of the data The central processing unit also sends a synchronization message to the entire network, this message being repeated by the controllers 100 to the nodes 20. For example, the central processing unit may contain a high-precision clock (such as a quartz oscillator or GPS), the controllers 100 and nodes 20 optionally being frequency-dependent by means of a phase lock loop (PLL).

The nodes 20 and controllers 100 are thus devised to only perform signal processing functions. In other words, the nodes 20 and controllers 100 progressively return the seismic data to the central processing unit via the common concentrator 210.

The power supplying lines 300 supply the controllers 100 and the sensors with a high voltage such as a voltage about 300V-1000V, so as to limit the level of current in said power supplying lines 300.

A module 120 of each controller 100 converts the High Voltage received from a power supplying line 300 to a Low Voltage to power the seismic sensors bi-directionally via the lines 30. The controllers 100 also retrieve and process data from the seismic sensors connected on each side, via the data lines 30 and operate interface between the sensors and the transmission lines 200 by directing the data received from the sensors on the transmission lines 200.

According to the present invention, the Y data transmission lines 200 are alternately connected to one out of Y successive controllers 100 and each controller 100 is adapted to redirect towards at least an adjacent controller 100 the data associated with a data transmission line 200 when this data transmission line is detected as defective.

Preferentially each controller $100_N$ is adapted to redirect towards the two adjacent controllers $100_{N-1}$ and $100_{N+1}$ the data associated with a data transmission line 200 when this data transmission line is detected as defective.

Figure 1:
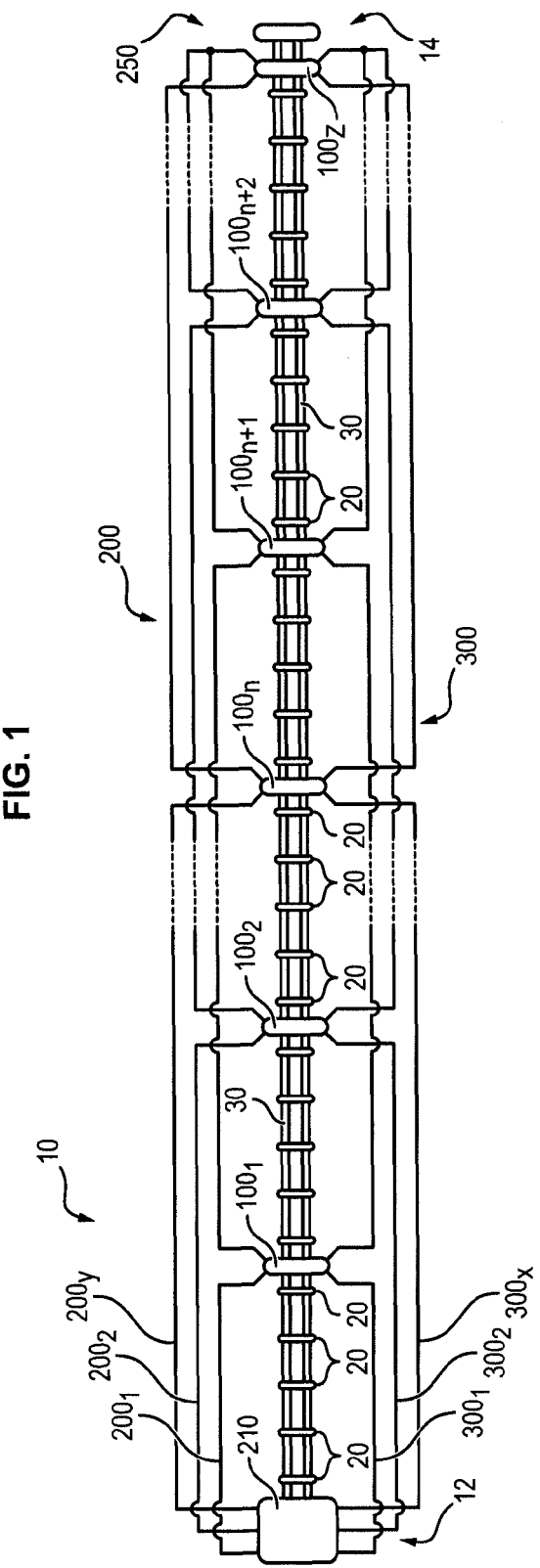
FIG. 1 is a general view of a seismic cable in accordance with the present invention.

For example as illustrated on FIG. 1, a first data transmission line $200_1$ is connected to a first controller $100_1$ as well as to any following controller $100_{1+iy}$ modulo Y, a second data transmission line $200_2$ is connected to a second controller $100_2$ as well as to any following controller $100_{2+iy}$ modulo Y, a Nth data transmission line $200_N$ is connected to a Nth controller $100_N$ as well as to any following controller $100_{N+iy}$ modulo Y, a N+1th data transmission line $200_{N+1}$ is connected to a N+1th controller $100_{N+1}$ as well as to any following controller $100_{N+1+iy}$ modulo Y and the Yth data transmission line is connected to a Yth controller $100_Y$ as well as to any following controller $100_{y+iy}$ modulo Y.

Moreover each Nth controller $100_N$ is adapted to redirect data towards the adjacent controllers N−1 and N+1 if the transmission line N is defective.

Furthermore, according to the present invention, the X power supplying lines 300 are alternately connected to one out of X successive controllers 100 and each controller 100 is adapted for applying on a power supplying line 300 detected as defective the electrical tension provided by another power supplying line 300.

For example as illustrated on FIG. 1, a first power supplying line $300_1$ is connected to a first controller $100_1$ as well as to any following controller $100_{1+ix}$ modulo X, a second power supplying line $300_2$ is connected to a second controller $100_2$ as well as to any following controller $100_{2+ix}$ modulo X, a Nth power supplying line $300_N$ is connected to a Nth controller $100_N$ as well as to any following controller $100_{N+ix}$ modulo X, a N+1th power supplying line $300_{N+1}$ is connected to a N+1th controller $100_{N+1}$ as well as to any following controller $100_{N+1+ix}$ modulo X and the Xth power supplying line $300_X$ is connected to a Xth controller $100_X$ as well as to any following controller $100_{X+ix}$ modulo X.

Moreover, the Nth controller $100_N$ is adapted to apply on power supply line N the voltage received from the power supplying line N+1 if the power supplying N is defective.

Figure 2:
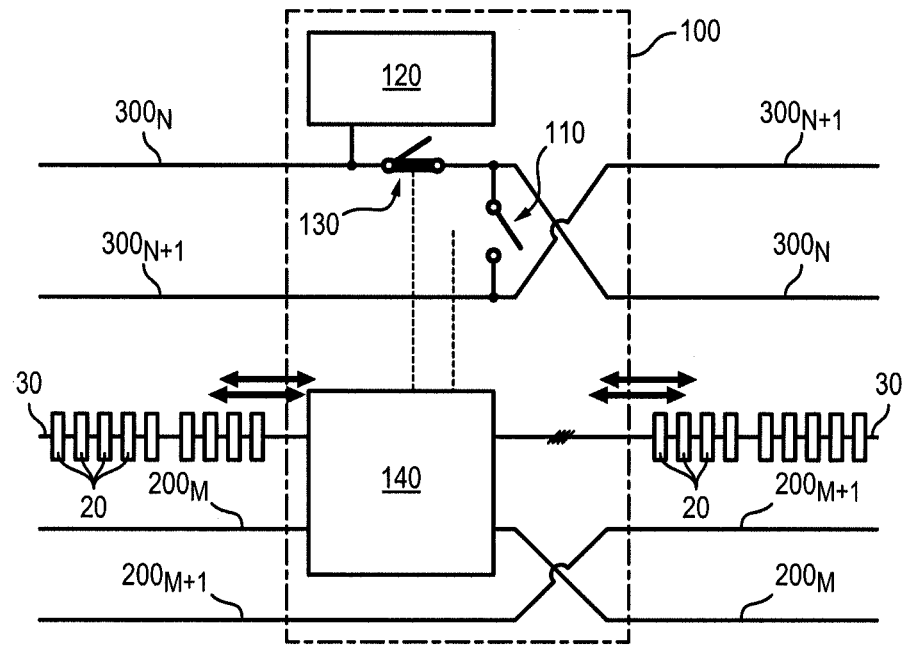
FIG. 2 is a schematic view of a controller associated with two transmission lines and two power supplying lines.
Figure 3:
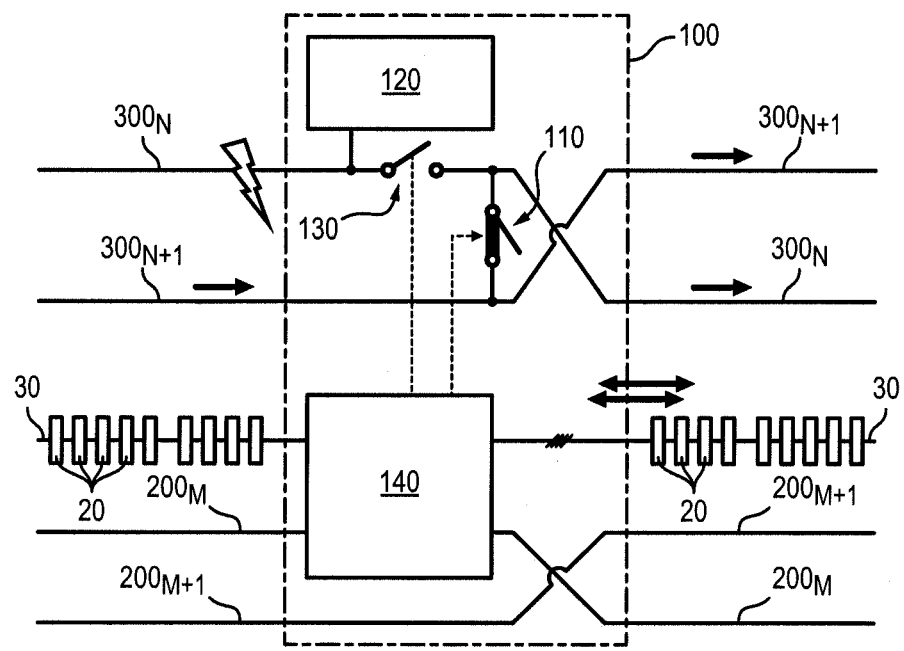
FIG. 3 is a view of the same controller when switching a power supplying line after detection of a defective power supplying line.
Figure 6:
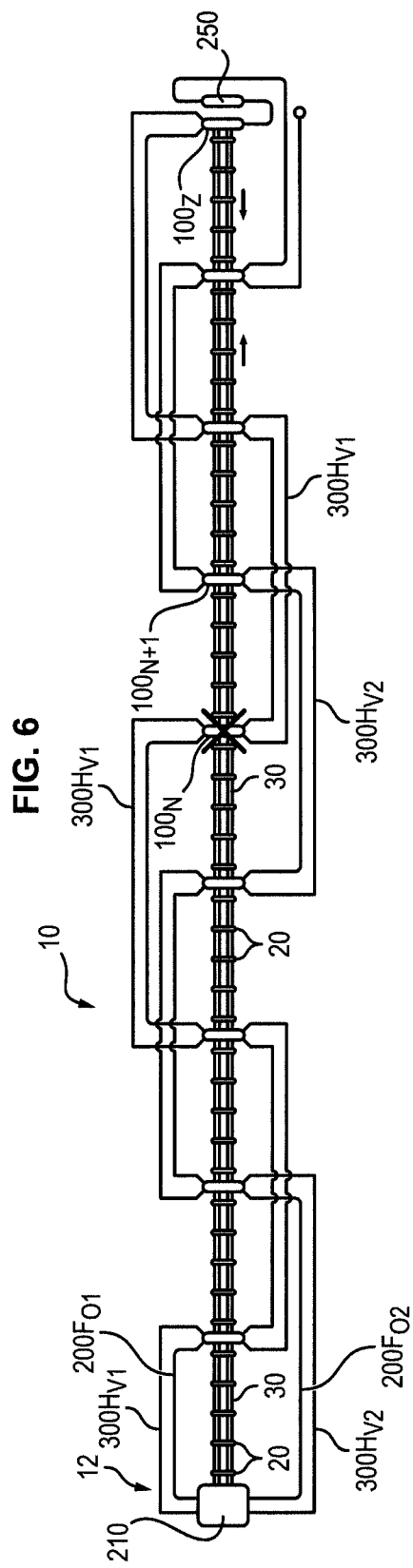

As illustrated on FIGS. 2 and 3, each controller 100 comprises a High Voltage switch 110 suitable for connecting two different High Voltage rails 300 when necessary.

More precisely each controller $100_N$ comprises:
- a module 120 to convert the High Voltage received from the supplying lines 300 to Low Voltage,
- a main switch 130 on the power supplying line $300_N$; in normal operation the switch 130 is closed as illustrated on FIG. 2 so as to maintain continuity of power supplying line $300_N$; contrarily when power supplying line $300_N$ is detected as defective upwards of controller $100_N$, said controller $100_N$ opens the switch 130; this main switch 130 can thus be assimilated to an insulator (insulated switch);
- an auxiliary switch 110. Said auxiliary switch 110 is provided downstream said main switch 130 and is suitable to connect the power supplying line $300_N$ with the power supplying line $300_{N+1}$ when the upwards part of the power supplying line $300_N$ is detected as defective; this auxiliary switch 110 can thus be assimilated to a "bypass" switch in order to use a non-defective power line;
- a processor unit 140 adapted for bi-directionnal powering of the nodes 20 and sensors via the lines 30 as well as bi-directionnal retrieve of data from the lines 30 so as to direct these data upon associated data transmission line $200_M$; when data transmission line $200_M$ is defective, controller M is adapted to redirect towards at least one of the adjacent controllers M−1 and M+1 the data associated with the transmission line $200_M$ so that at least one of said controllers M−1 and M+1 may route the redirected data upon the associated data transmission lines $200_{M-1}$ and or $200_{M+1}$.

In another embodiment of the invention, if a power line $300_N$ of a controller $100_N$ is detected as defective, the main switch 130 of a previous controller powered by this same power line $300_N$ and placed before this controller $100_N$ is opened too (for example, in a three HV rails configuration, two controller are intercalated between the previous controller and the defective controller $100_N$). Thus, a complete isolation of the power disturbance is performed.

Switches 130 and 110 are preferentially electronic switches such as MOSFET or JBT.

In normal operation without any failure, each controller 100 is connected to only one optical backbone 200 and one High Voltage rail 300. However as indicated above, when a failure is detected by a controller 100 on a High Voltage rail 300, this controller 100 switches on this N supplying line 300 the electrical tension issued from another N+1 supplying line 300. Consequently, in case of one rail failure, the controller 100 is able to propagate High Voltage from a working rail to the faulty rail. Thus, one of the X rails 300 which is working correctly provides power to the controller by default.

In practice, the control of the switch 110 may be operated fully automatically by a controller 100 upon detection of a failure. Preferentially, when a failure is detected on a part of a power supplying line $300_N$, the controller 100 associated to the same power supplying line $300_N$ which is immediately upwards the failure part is activated to close its switch 110 so as to maintain powering of all downwards controllers $100_{N+iX}$. However another controller 100 may be activated depending of the architecture of the seismic cable and/or of the location of the failure part. Alternatively the control of the switches 110 may be initiated upon detection of a failure, by a human operator so as to determine the better switch 110 to close for optimizing the powering of the seismic cable when a failure is detected.

As illustrated on FIG. 1 as well as on FIGS. 4, 5, 6 and 8, the seismic cable according to the present invention includes also at the tail end 14 an anchoring cap 250 forming a terminal reversing loop for the transmission lines. The anchoring cap 250 is a passive device connected at the end of the data transmission lines 200 that allows looping the optical backbone, to increase the system redundancy.

The terminal reversing loop interconnects the tail ends of pairs of data transmission lines.

Reversing loop for the transmission lines can also be done on a specific tail controller.

When the number Y of optical fibers 200 is even, preferentially the anchoring cap 250 operates a connection by pair of optical fibers at the tail end: data transmission line 1 with data transmission line 2, data transmission line 3 with data transmission line 4, . . . data transmission line Y−1 with data transmission line Y.

When the number Y of optical fibers 200 is uneven, preferentially the anchoring cap 250 operates also a connection by pair of optical fibers at the tail end, with the exception of the optical fiber K connected to the latest controller Z: data transmission line 1 with data transmission line 2, data transmission line 3 with data transmission line 4, . . . data transmission line K−2 with data transmission line K−1, data transmission line K+1 with data transmission line K+2 . . . data transmission line Y−1 with data transmission line Y.

There is no need to loop the supplying rails 300 in the anchoring cap 250 due to the switch provided 110 inside each controller 100.

The architecture of the system in accordance with the present invention leads to a seismic cable tolerant to several sensors or full controllers failure assuming there is no two consecutive failing controllers. Indeed, as illustrated on FIG. 4 assuming that a controller failure is due to the fact that an associated optical fiber 200FO1 is defective, the data which should be routed on this optical fiber 200FO1 are re-routed by all the controllers 100 associated to the same optical fiber 200FO1 through the adjacent controllers and consequently re-routed through a second optical fiber 200FO2.

The system in accordance with the present invention is also tolerant to failure of electrical power supplying of controllers. Indeed as illustrated on FIG. 5 in case a supplying line 300 HV1 is defective at the level of a controller $100_N$, theoretically all the downstream controllers $100_{N+iX}$ modulo X associated to the same supplying line 300HV1 are not powered anymore. However as illustrated on FIG. 6 one of the controllers $100_{N+1}$ switches its switch 110 so as to power on the High Voltage rail 300HV1 in default on an active power supplying line 300HV2, in order to power on again all the controllers 100 downwards.

The level of the High Voltage applied on the power supplying lines 300 as well as the number of power supplying lines 300 are sized to reach the line's length required.

The controllers 100 may be connected by separate connectors respectively to the data transmission lines 200 with optical connectors and to the power supplying lines 300 with electrical connectors. However the controllers 100 are preferentially connected to the data transmission lines 200 and to the power supplying lines 300, by hybrid connectors allowing both optical and electrical connections.

The man skilled in the art will appreciate that the architecture of the seismic cable in accordance with the invention allows a high number of channels on a same line/seismic cable in real time and a high redundancy since several sensors and/or controllers failures do not imply system downtime.

Consequently the present invention allows seismic cables having an extended length. Depending on the number of channels and spacing required between the sensors, for an OBC array for example, a single line could be built with undulations snaking for one full spread. With such a provision the number of extenders connected to the recorder vessel 11 is then reduced.

While the invention has been shown and describes by referring to a preferred embodiment thereof, it is to be understood that the invention is not limited to the specific form of this embodiment and that many changes and modifications may be made therein without departing from the scope of the invention.

The detailed above description relates to marine seismic prospection. However as indicated in the beginning of the specification, the invention may also apply to land seismic prospection.

The invention claimed is:

1. A seismic cable for seismic prospection comprising:
sensors distributed along the seismic cable, data transmission lines (200) extending along the full length of the seismic cable for conveying data signals issued from the sensors,
controllers (100) also distributed along the seismic cable and adapted for operating as an interface between the sensors and the data transmission lines (200), and
power supplying lines (300) for electrically supplying the controllers (100) and the sensors, wherein said seismic cable comprises:
X power supplying lines (300) and Y data transmission lines (200) said X power supplying lines (300) being alternately connected to one out of X successive controllers (100) so that the first X controllers are fed by said X power supplying lines respectively and every controller downstream of said first X controllers are power supplied in series with the upstream X controllers respectively,
and each said controller (100) being configured for, if an upstream power supply portion of a power supplying line (300) connected to said controller is detected as defective, applying on a downstream power supply portion of said power supplying line (300) detected as defective an electrical tension provided by another power supplying line (300), wherein the Y data transmission lines (200) are alternately connected to one out of Y successive controllers (100) and each controller (100) being adapted to redirect towards at least one adjacent controller (100) the data associated with a data transmission line (200) when this data transmission line (200) is detected as defective.

2. Seismic cable according to claim 1, wherein said seismic cable is a seismic streamer maintained at a selected depth or an Ocean Bottom Cable lying on the sea bed.

3. Seismic cable according to one of claim 1 or 2, wherein each controller (100) comprises a switch (110) suitable to connect locally two power supplying lines (300).

4. Seismic cable according to claim 1, wherein each controller (100) comprises a main switch (130) closed in normal operation so as to maintain continuity of a power supplying line ($300_N$) and which is opened when contrarily said power supplying line ($300_N$) is detected as defective upwards of said controller ($100_N$), and an auxiliary switch (110) provided downstream said main switch (130) and suitable to connect the defective power supplying line ($300_N$) with another active power supplying line ($300_{N+1}$) when the upwards part of a power supplying line ($300_N$) is detected as defective.

5. Seismic cable according to claim 1, wherein X=2.

6. Seismic cable according to claim 1, wherein switching for applying on a power supplying line (300) detected as defective the electrical tension provided by another power supplying line (300) is operated automatically by the controllers (100) upon detection of a failure.

7. Seismic cable according to claim 1, wherein switching for applying on a power supplying line (300) detected as defective the electrical tension provided by another power supplying line (300) is initiated upon detection of a failure, by a human operator so as to determine the best switch (110) to close for optimizing the powering of the seismic cable when a failure is detected.

8. Seismic cable according to claim 1, comprising a terminal reversing loop (250) which interconnects the tail ends of pairs of data transmission lines (300).

9. Seismic cable according to claim 8, wherein when the number Y of data transmission lines (200) is uneven, the terminal reversing loop (250) operates a connection by pair of optical fibers at the tail end, with the exception of the optical fiber K connected to the latest Z controller (100).

10. Seismic cable according to claim 1, wherein a reversing loop which interconnects the tail ends of pairs of data transmission lines is provided in a tail controller.

11. Seismic cable according to claim 1, wherein the sensors belong to a group formed by at least one of:
hydrophones;
geophones;
accelerometers.

12. Seismic cable according to claim 1, wherein said data transmission lines (200) are optical fibers.

13. Seismic cable according to claim 1, wherein the outputs of the sensors are connected to nodes (20) which are linked to the controllers (100) via data lines (30), each controller (100) converting a High Voltage received from a power supplying line (300) to a Low Voltage to power the seismic sensors bi-directionally via the data lines (30) and the controllers (100) also retrieving and processing data from the seismic sensors connected on each side, via the data lines (30).

14. A seismic prospection process implementing a seismic cable (10) comprising sensors, distributed along the seismic cable, data transmission lines (200) extending along the full length of the seismic cable for conveying data. signals issued from the sensors, controllers (100) also distributed along the seismic cable and adapted for operating as an interface between the sensors and the data transmission lines, and power supplying lines (300) for electrically supplying the controllers and the sensors, wherein said seismic cable comprises X power supplying lines (300) and Y data transmission lines (200), said X power supplying lines (300) being alternately connected to one out of X successive controllers (100) so that the first X controllers are fed by said X power supplying lines respectively and every controller downstream of said first X controllers are power supplied in series with the upstream X controllers respectively, while the Y data transmission lines (200) are alternately connected to one out of Y successive controllers (100), the process includes the step of:

if an upstream power supply portion of a power supplying line (300) connected to one of said X successive controllers is detected as defective, applying on a downstream power supply portion of said power supplying line (300) detected as defective an electrical tension provided by another power supplying line (300), and redirecting towards at least one adjacent controller (100) the data associated with a data transmission line (200) when this data transmission line (200) is detected as defective.

\* \* \* \* \*